US008624569B2

(12) United States Patent
Heng

(10) Patent No.: US 8,624,569 B2
(45) Date of Patent: Jan. 7, 2014

(54) VOLTAGE REGULATOR

(75) Inventor: Socheat Heng, Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 13/433,945

(22) Filed: Mar. 29, 2012

(65) Prior Publication Data

US 2012/0249104 A1 Oct. 4, 2012

(30) Foreign Application Priority Data

Mar. 30, 2011 (JP) ................................. 2011-075592

(51) Int. Cl.
*G05F 1/00* (2006.01)
*H02H 9/02* (2006.01)

(52) U.S. Cl.
USPC ............................ 323/282; 323/284; 323/908

(58) Field of Classification Search
USPC ......... 323/280–285, 274–277, 271, 313, 901, 323/908; 315/291; 327/539–542, 538, 198, 327/545; 361/18, 87, 93.9; 363/49, 50, 55, 363/56.01
See application file for complete search history.

(56) References Cited

U.S. PATENT DOCUMENTS

| | | | | |
|---|---|---|---|---|
| 6,348,833 | B1 | 2/2002 | Tsujimoto et al. | |
| 7,768,242 | B2 * | 8/2010 | Wei et al. | 323/222 |
| 2009/0189584 | A1 * | 7/2009 | Suzuki | 323/284 |
| 2009/0206807 | A1 * | 8/2009 | Imura et al. | 323/277 |

* cited by examiner

*Primary Examiner* — Timothy J Dole
*Assistant Examiner* — Carlos Rivera-Perez
(74) *Attorney, Agent, or Firm* — Brinks Gilson & Lione

(57) ABSTRACT

A voltage regulator permits reduced current consumption by promptly and timely stopping the operation of an inrush current protection circuit immediately after the voltage regulator is started up. The voltage regulator has an output voltage detection circuit, which issues a detection signal to actuate the inrush current protection circuit when a low voltage at an output terminal is detected at the time of starting up the voltage regulator. When it is detected that the voltage at the output terminal has reached a predetermined level, the operation of the inrush current protection circuit is stopped and a power path of the output voltage detection circuit is cut off.

1 Claim, 3 Drawing Sheets

VOLTAGE REGULATOR

RELATED APPLICATIONS

This application claims priority under 35 U.S.C. §119 to Japanese Patent Application No. 2011-075592 filed on Mar. 30, 2011, the entire content of which is hereby incorporated by reference.

BACKGROUND OF THE INVENTION

1. Field of the Invention

The present invention relates to a voltage regulator provided with an inrush current protection circuit and more particularly to an output voltage detection circuit that controls an inrush current protection circuit.

2. Description of the Related Art

A conventional inrush current protection circuit will be described. FIG. 3 is a circuit diagram of a conventional constant-voltage circuit. The conventional constant-voltage circuit is composed of a constant-voltage source 401 and a soft start circuit. The soft start circuit has a comparator 404, a delay circuit 412, a constant-current source 407, a capacitor 408, a resistor 403, and switches 402, 410 and 411.

The contact point of the constant-current source 407 and the capacitor 408 is connected to an output terminal 101 of the constant-voltage circuit. The output terminal 101 is connected to a non-inverting input terminal of the comparator 404, and an output terminal of the constant-voltage source 401 is connected to an inverting input terminal of the comparator 404 through the intermediary of an offset voltage 405. An output terminal of the comparator 404 is connected to the switch 402, the constant-current source 407, and the delay circuit 412. An output terminal of the delay circuit 412 is connected to the switch 411.

The capacitor 408 is charged by receiving constant current Ic from the constant-current source 407. The comparator 404 compares a voltage, which is obtained by subtracting the predetermined offset voltage 405 from an output voltage of the constant-voltage source 401, and a voltage at the contact point of the constant-current source 407 and the capacitor 408, and outputs a signal based on the result of the comparison. If the voltage at the contact point of the constant-current source 407 and the capacitor 408 becomes higher than the voltage obtained by subtracting the predetermined offset voltage 405 from the output voltage of the constant-voltage source 401, then the switch 402 turns on, the constant-current source 407 stops, and the delay circuit 412 starts to operate. When the switch 402 is turned on, the capacitor 408 is charged through the resistor 403 on the basis of an RC time constant by the constant-voltage source 401. After predetermined time elapses since the signal was received from the comparator 404, the delay circuit 412 turns the switch 411 on. When the switch 411 is turned on, the output voltage of the constant-voltage source 401 is directly output to the output terminal 101.

The operation of the conventional constant-voltage circuit will now be described. In the state wherein the switch 410 is on, the constant-voltage circuit is not in operation and the output voltage at the output terminal 101 is 0 volt. When the switch 410 is turned off, the constant-voltage circuit starts the operation thereof. The constant-current source 407 supplies the constant current Ic to start charging the capacitor 408 with the constant current. At this time, the output voltage at the output terminal 101 linearly rises according to the constant current Ic and the capacitance of the capacitor 408. If the voltage charged in the capacitor 408 exceeds the voltage, which is obtained by subtracting the offset voltage 405 from the voltage of the constant-voltage source 401, then the output signal of the comparator 404 is inverted. This causes the switch 402 to turn on and the constant-current source 407 to stop, and the delay circuit 412 to start its operation. When the constant-current source 407 stops its operation, the capacitor 408 is charged by the output voltage of the constant-voltage source 401 through the resistor 403.

The moment the switch 411 turns on after the elapse of the predetermined time since the delay circuit 412 was actuated, the output voltage of the constant-voltage source 401 immediately reaches the output voltage of the output terminal 101. As described above, the output voltage of the output terminal 101 of the constant-voltage circuit gradually increases, thus allowing the output terminal 101 of the constant-voltage circuit to be protected from an inrush current (refer to, for example, FIG. 2 in patent document 1).

[Patent Document 1] Japanese Patent Application Laid-Open No. 2000-56843

However, the conventional art has been posing a problem in that current continues to be supplied to the soft start circuit after the output voltage reaches a predetermined level, thus wastefully consuming the current.

SUMMARY OF THE INVENTION

The present invention has been made with a view toward the problem described above, and it is an object of the invention to provide a voltage regulator capable of reducing consumed current by promptly and timely interrupting the operation of the inrush current protection circuit immediately after the voltage regular is started up.

A voltage regulator provided with an inrush current protection circuit in accordance with the present invention includes: a reference voltage circuit which outputs a reference voltage; an output transistor; a differential amplifier circuit which amplifies and outputs the difference between the reference voltage and a divided voltage obtained by dividing a voltage output from the output transistor and controls a gate of the output transistor; an inrush current protection circuit which controls a gate voltage of the output transistor to prevent an inrush current; and an output voltage detection circuit which controls the inrush current protection circuit, wherein the output voltage detection circuit includes: a constant-current circuit having an input terminal thereof connected to a power supply terminal and an output terminal thereof connected to an output terminal of the output voltage detection circuit; a capacitor having one end thereof connected to the output terminal of the output voltage detection circuit and the other end thereof connected to a ground terminal; an amplifier, an inverting input terminal of which receives the divided voltage and a non-inverting input terminal of which receives the reference voltage; a first transistor, a source of which is connected to the power supply terminal, a gate of which is connected to the output terminal of the output voltage detection circuit, and a drain of which is connected to a power supply terminal of the amplifier; and a second transistor, a source of which is connected to the power supply terminal, a gate of which is connected to an output terminal of the amplifier, and a drain of which is connected to the output terminal of the output voltage detection circuit.

The voltage regulator provided with the inrush current protection circuit in accordance with the present invention is capable of monitoring the output voltage of the voltage regulator and promptly and timely isolating the inrush current protection circuit, and the voltage monitoring circuit is capable of shutting off a current path, thus making it possible to achieve lower power consumption.

DETAILED DESCRIPTION OF THE PREFERRED EMBODIMENTS

Embodiments of the present invention will be described with reference to the accompanying drawings.

First Embodiment

Figure 1:
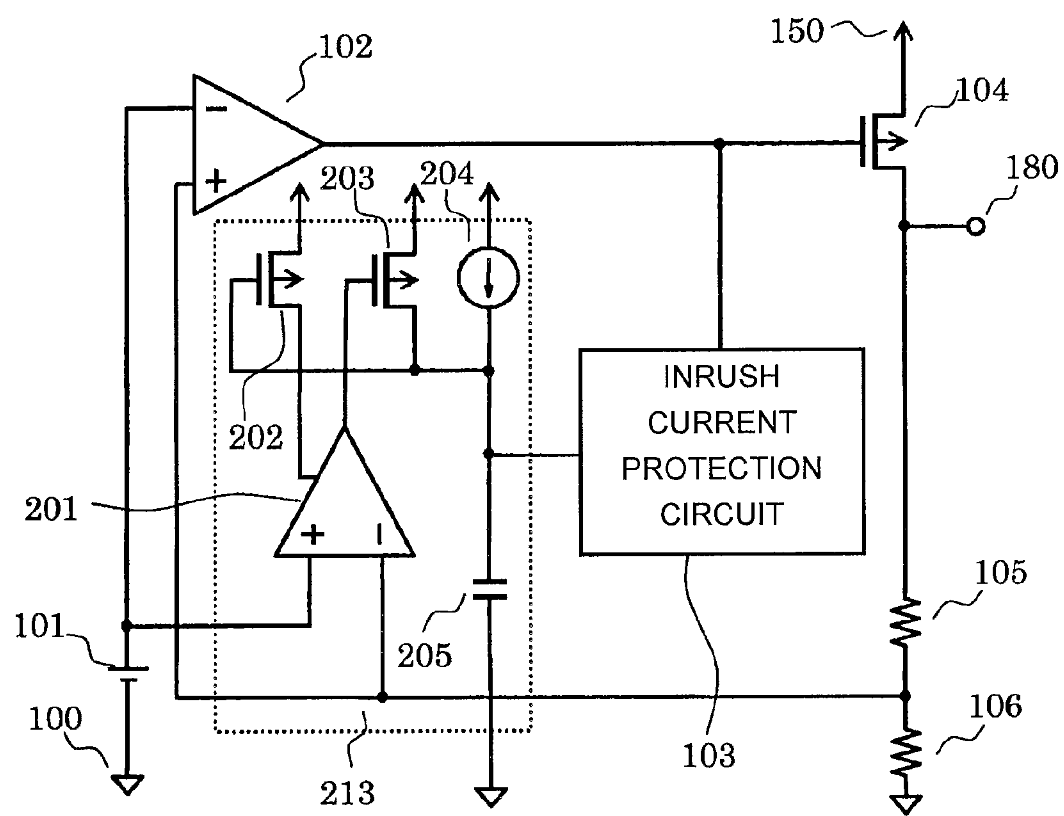
FIG. 1 is a circuit diagram of a voltage regulator provided with an inrush current protection circuit according to a first embodiment.

FIG. 1 is a circuit diagram of a voltage regulator having an inrush current protection circuit according to a first embodiment. The voltage regulator of the first embodiment is constituted of a reference voltage circuit 101, a differential amplifier circuit 102, an output transistor 104, resistors 105 and 106 of a voltage-dividing circuit, an inrush current protection circuit 103, and an output voltage detection circuit 213. The output voltage detection circuit 213 is formed of PMOS transistors 202 and 203, a constant-current circuit 204, an amplifier with offset 201, and a capacitor 205.

The inverting input terminal of the differential amplifier circuit 102 is connected to one terminal of the reference voltage circuit 101, while the non-inverting input terminal thereof is connected to the connection point of the resistors 105 and 106, and the output terminal thereof is connected to the gate of the output transistor 104 and the output terminal of the inrush current protection circuit 103. The other end of the reference voltage circuit 101 is connected to a ground terminal 100. The amplifier with offset 201 has a non-inverting input terminal thereof connected to one terminal of the reference voltage circuit 101, an inverting input terminal thereof connected to the connection point of the resistors 105 and 106, and an output terminal thereof connected to the gate of the PMOS transistor 203. The PMOS transistor 203 has a drain thereof connected to the input terminal of the inrush current protection circuit 103 and a source thereof connected to a power supply terminal 150. The PMOS transistor 202 has a gate thereof connected to the input terminal of the inrush current protection circuit 103, a drain thereof connected to the power supply terminal of the amplifier with offset 201, and a source thereof connected to the power supply terminal 150. The constant-current circuit 204 has its one terminal connected to the input terminal of the inrush current protection circuit 103 and one terminal of the capacitor 205 and its other terminal connected to the power supply terminal 150. The other end of the capacitor 205 is connected to the ground terminal 100.

The operation of the voltage regulator according to the present embodiment will now be described.

The resistors 105 and 106 divide an output voltage Vout, which is the voltage of an output terminal 180, and output a divided voltage Vfb. The differential amplifier circuit 102 compares an output voltage Vref of the reference voltage circuit 101 with the divided voltage Vfb to control the gate voltage of the output transistor 104 such that the output voltage Vout remains constant. If the output voltage Vout is higher than a predetermined voltage, then the divided voltage Vfb will be higher than the reference voltage Vref. Further, the output signal of the differential amplifier circuit 102 (the gate voltage of the output transistor 104) will be high and the output transistor 104 turns off, causing the output voltage Vout to fall. Thus, the output voltage Vout is controlled to remain at a constant level. If the output voltage Vout is lower than the predetermined voltage, then a reverse operation from the above is performed to increase the output voltage Vout. Thus, the output voltage Vout is controlled to remain at the constant level.

The following will describe the operation at the startup of the supply voltage of the voltage regulator according to the present embodiment.

Immediately after the power is turned on, the voltage at the output terminal of the output voltage detection circuit 213 is a ground voltage, so that the PMOS transistor 202 turns on, supplying power to the amplifier with offset 201. The output voltage Vout has not yet risen, so that the divided voltage Vfb is lower than the reference voltage Vref, and the amplifier with offset 201 outputs a Hi signal, causing the PMOS transistor 203 to turn off. This causes the capacitor 205 to be charged with the current of the constant-current circuit 204, gradually increasing the voltage at the output terminal of the output voltage detection circuit 213. The inrush current protection circuit 103 operates to prevent an inrush current as long as it receives a Lo signal from the output voltage detection circuit 213. The startup time of the output of the output voltage detection circuit 213 depends on the current value of the constant-current circuit 204 and the capacitance value of the capacitor 205. The startup time is set to be longer than the startup time of the voltage regulator such that the operation of the inrush current protection circuit 103 will not stop while the voltage regulator is being started up. The operation of the inrush current protection circuit 103 is stopped when the output of the output voltage detection circuit 213 has risen to a certain level and no longer consumes current after the voltage regular has been started up. Further, the PMOS transistor 202 of the output voltage detection circuit 213 turns off to stop the operation of the amplifier with offset 201, so that no current will be consumed after the voltage regulator starts up.

The amplifier with offset 201 adds an offset to the non-inverting input terminal such that the divided voltage Vfb becomes higher than the reference voltage Vref. This makes it possible to prevent the inrush current protection circuit 103 and the output voltage detection circuit 213 from repeatedly turning on/off when the divided voltage Vfb reaches a level in the vicinity of the reference voltage Vref.

As described above, the voltage regulator according to the first embodiment is capable of isolating the inrush current protection circuit promptly and timely immediately following the startup of the voltage regulator, thus making it possible to reduce current consumption by interrupting the supply of power to the output voltage detection circuit after isolating the inrush current protection circuit.

Second Embodiment

Figure 2:
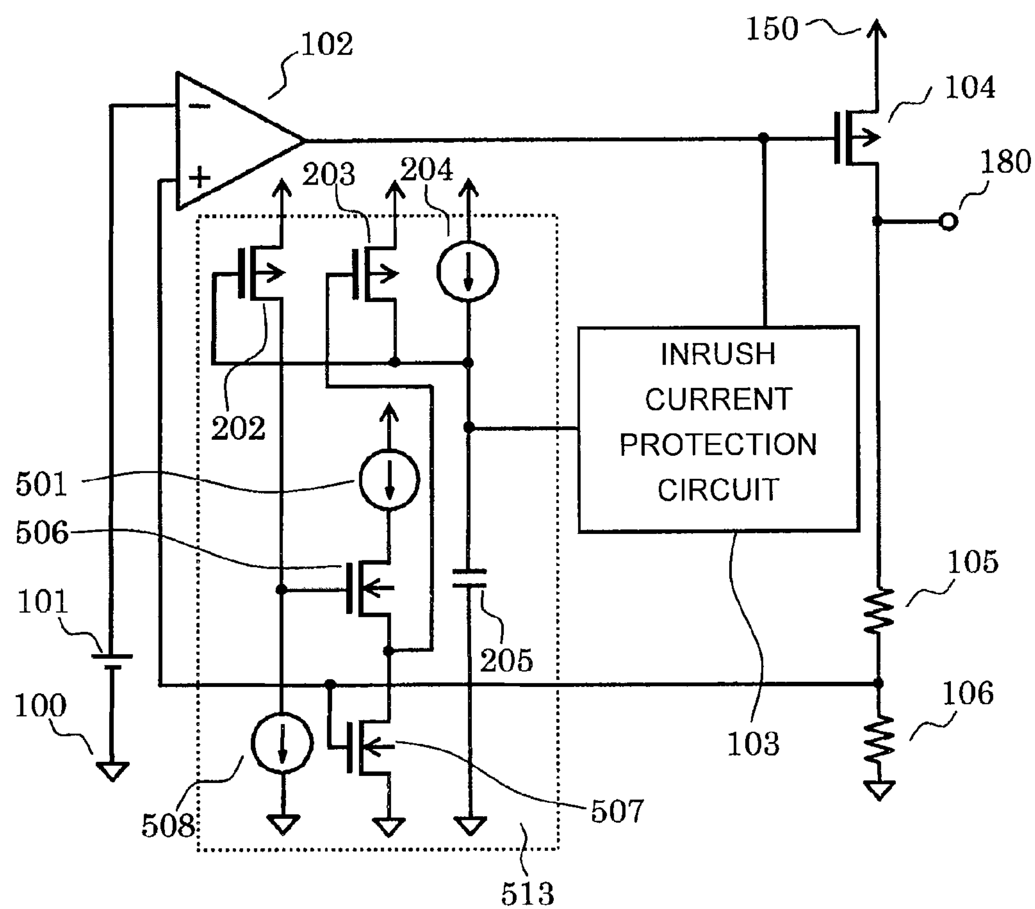
FIG. 2 is a circuit diagram of a voltage regulator provided with an inrush current protection circuit according to a second embodiment.
Figure 3:
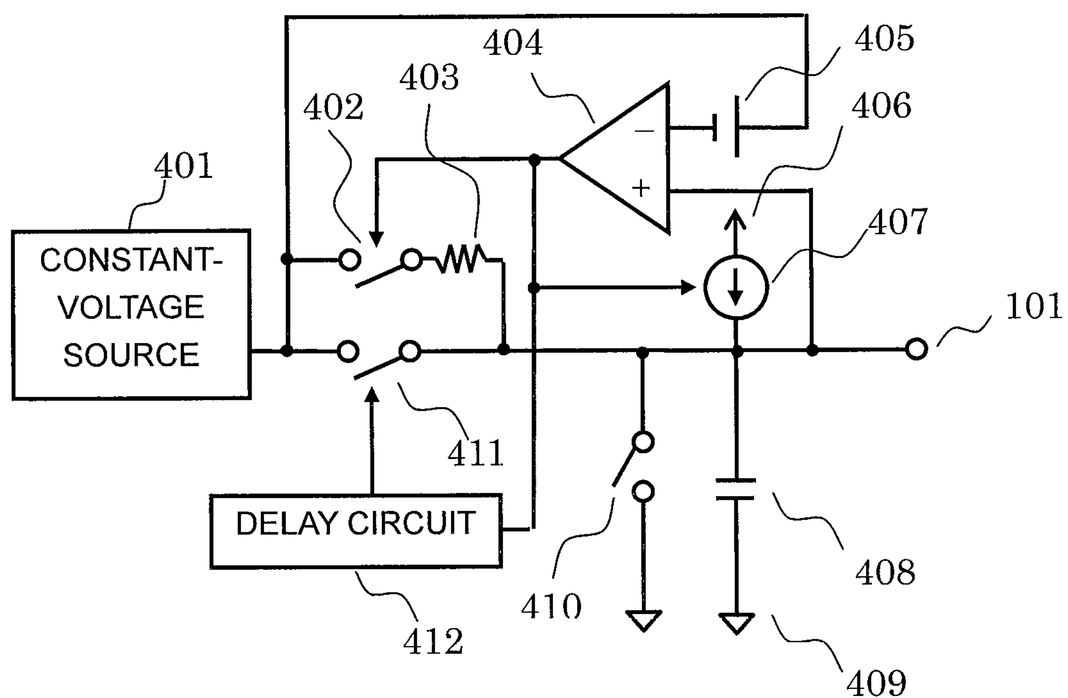
FIG. 3 is a circuit diagram of a constant-voltage circuit provided with a conventional inrush current protection circuit.

FIG. 2 is a circuit diagram of a voltage regulator according to a second embodiment. The voltage regulator according to the second embodiment differs from the one illustrated in FIG. 1 in the provision of an output voltage detection circuit 513, which has a different configuration from that of the output voltage detection circuit 213.

The following will describe the configuration of the voltage regulator according to the second embodiment. The description of the same part as that of the first embodiment will be omitted.

A PMOS transistor 203 has a drain thereof connected to the input of an inrush current protection circuit 103, a source thereof connected to a power supply terminal 150, and a gate thereof connected to a source of an NMOS transistor 506 and a drain of an NMOS transistor 507. A PMOS transistor 202 has a gate thereof connected to an input of the inrush current protection circuit 103, a drain thereof connected to a gate of the NMOS transistor 506 and one terminal of a constant-current circuit 508, and a source thereof connected to the power supply terminal 150. The other terminal of the constant-current circuit 508 is connected to a ground terminal 100. A constant-current circuit 204 has one terminal thereof connected to the input of the inrush current protection circuit 103 and one terminal of a capacitor 205, and has the other end thereof connected to the power supply terminal 150. The other end of the capacitor 205 is connected to the ground terminal 100. A constant-current circuit 501 has one terminal thereof connected to a drain of the NMOS transistor 506 and the other end thereof connected to the power supply terminal 150. The NMOS transistor 507 has a gate thereof connected to a non-inverting input terminal of a differential amplifier circuit 102 and a source thereof connected to the ground terminal 100.

The operation of the voltage regulator according to the second embodiment will now be described.

A constant-current source 501 and the NMOS transistor 507 constitute a single-ended amplifier. An inversion threshold value of the single-ended amplifier is set to be slightly lower than a feedback voltage Vfb.

Immediately after the power is turned on, the voltage at the output terminal of the output voltage detection circuit 513 is an earth voltage, so that the PMOS transistor 202 turns on. The voltage at the gate of the NMOS transistor 506 becomes high, so that the NMOS transistor 506 turns on, thus activating the single-ended amplifier.

The voltage at an output terminal 180 is also the earth voltage, so that the single-ended amplifier outputs a Hi signal, turning the PMOS transistor 203 off. Hence, the current from the constant-current circuit 204 charges the capacitor 205, gradually increasing the voltage at the output terminal of the output voltage detection circuit 513. The inrush current protection circuit 103 operates to prevent an inrush current as long as it continues to receive a Lo signal from the output voltage detection circuit 513. The startup time of the output of the output voltage detection circuit 513 depends on the current value of the constant-current circuit 204 and the capacitance value of the capacitor 205. The startup time is set to be longer than the startup time of the voltage regulator such that the operation of the inrush current protection circuit 103 will not stop while the voltage regulator is being started up.

When the voltage at the output terminal 180 further increases until the feedback voltage Vfb exceeds the inversion threshold value of the single-ended amplifier, the output of the single-ended amplifier inverts and the Lo signal is issued. The PMOS transistor 203 turns on, causing the voltage at the output terminal of the output voltage detection circuit 513 to be switched to a Hi level, which in turn causes the inrush current protection circuit 103 to turn off. At the same time, the PMOS transistor 202 also turns off, so that the voltage at the gate of the NMOS transistor 506 is brought to the earth voltage by the constant-current circuit 508.

The PMOS transistor 202 and the NMOS transistor 506 turn off, and therefore, the output voltage detection circuit 513 no longer has a current path and therefore stops consuming current.

As described above, the voltage regulator according to the second embodiment is capable of isolating the inrush current protection circuit promptly and timely to interrupt the supply of power to the output voltage detection circuit after isolating the inrush current protection circuit, thus making it possible to reduce power consumption.

What is claimed is:

1. A voltage regulator comprising:

a reference voltage circuit which outputs a reference voltage;

an output transistor;

a differential amplifier circuit which amplifies and outputs a difference between the reference voltage and a divided voltage obtained by dividing an output voltage supplied from the output transistor and controls a gate of the output transistor;

an inrush current protection circuit which controls a gate voltage of the output transistor to prevent an inrush current; and an output voltage detection circuit which controls the inrush current protection circuit, wherein the output voltage detection circuit comprises:

a first constant-current circuit, an input terminal of which is connected to a power supply terminal and an output terminal of which is connected to an output terminal of the output voltage detection circuit;

a capacitor, one end of which is connected to the output terminal of the output voltage detection circuit and the other end of which is connected to a ground terminal;

a first transistor, a source of which is connected to the power supply terminal and a gate of which is connected to the output terminal of the output voltage detection circuit;

a second constant-current circuit, an input terminal of which is connected to a drain of the first transistor and an output terminal of which is connected to the ground terminal;

a second transistor, a source of which is connected to the power supply terminal and a drain of which is connected to the output terminal of the output voltage detection circuit;

a third constant-current circuit, an input terminal of which is connected to the power supply terminal;

a third transistor, a drain of which is connected to an output terminal of the third constant-current circuit, a gate of which is connected to the drain of the first transistor, and a source of which is connected to the gate of the second transistor; and a fourth transistor, a drain of which is connected to the source of the third transistor, a gate of which receives the divided voltage, and a source of which is connected to the ground terminal, wherein the third transistor maintains the second transistor in an open state until the output voltage of the output terminal of the output voltage detection circuit exceeds a first threshold, wherein after the output voltage of the output terminal of the output voltage detection circuit exceeds the first threshold, the output voltage detection circuit controls the inrush current protection circuit to allow the output transistor to output the output voltage, and the third transistor enters an open state, wherein after the output voltage supplied from the output transistor exceeds a second threshold threshold, the fourth transistor enters a closed state, which causes the second transistor to enter and remain in a closed state to thereby maintain the output voltage of the output terminal of the output voltage detection circuit above the first threshold.

* * * * *